US011652225B2

(12) United States Patent
Namba et al.

(10) Patent No.: US 11,652,225 B2
(45) Date of Patent: May 16, 2023

(54) FUEL CELL SYSTEM AND CONTROL METHOD FOR FUEL CELL SYSTEM

(71) Applicant: TOYOTA JIDOSHA KABUSHIKI KAISHA, Toyota (JP)

(72) Inventors: Ryouichi Namba, Okazaki (JP); Junichi Matsuo, Okazaki (JP); Hiroyuki Tsunekawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 17/235,231

(22) Filed: Apr. 20, 2021

(65) Prior Publication Data

US 2021/0376353 A1 Dec. 2, 2021

(30) Foreign Application Priority Data

May 29, 2020 (JP) .............................. JP2020-094378

(51) Int. Cl.
| | |
|---|---|
| *H01M 8/04746* | (2016.01) |
| *H01M 8/04225* | (2016.01) |
| *H01M 8/04223* | (2016.01) |
| *B60L 58/40* | (2019.01) |
| *B60L 53/54* | (2019.01) |
| *H01M 8/04537* | (2016.01) |
| *H01M 8/04858* | (2016.01) |

(52) U.S. Cl.
CPC ......... *H01M 8/04753* (2013.01); *B60L 53/54* (2019.02); *B60L 58/40* (2019.02); *H01M 8/0494* (2013.01); *H01M 8/04225* (2016.02); *H01M 8/04268* (2013.01); *H01M 8/04619* (2013.01); *H01M 8/04626* (2013.01); *H01M 8/04947* (2013.01); *H01M 2220/20* (2013.01); *H01M 2250/20* (2013.01)

(58) Field of Classification Search
CPC ........................... H01M 2250/20; B60L 58/40
See application file for complete search history.

(56) References Cited

U.S. PATENT DOCUMENTS

| | | | |
|---|---|---|---|
| 2010/0047630 A1 | 2/2010 | Imanishi et al. | |
| 2010/0112402 A1 | 5/2010 | Ogawa | |
| 2012/0288777 A1* | 11/2012 | Kazuno | H01M 8/04753 429/432 |

FOREIGN PATENT DOCUMENTS

| | | | |
|---|---|---|---|
| JP | 2008103250 A | 5/2008 | |
| JP | 2008269813 A | 11/2008 | |

* cited by examiner

*Primary Examiner* — Adam A Arciero
(74) *Attorney, Agent, or Firm* — Dickinson Wright, PLLC

(57) ABSTRACT

During performance of low efficiency power generation, a control device controls the flow rate of feed of the oxidizing agent gas so that the amount of heat generation of the fuel cell accompanying power generation loss becomes a first amount of heat generation when the state of a mount on which the fuel cell system is mounted is a first mode and controls the flow rate of feed of the oxidizing agent gas so that the amount of heat generation becomes a second amount of heat generation smaller than the first amount of heat generation when the state of the mount is a second mode where the generated electric power of the fuel cell fluctuates more easily compared with the first mode.

7 Claims, 11 Drawing Sheets

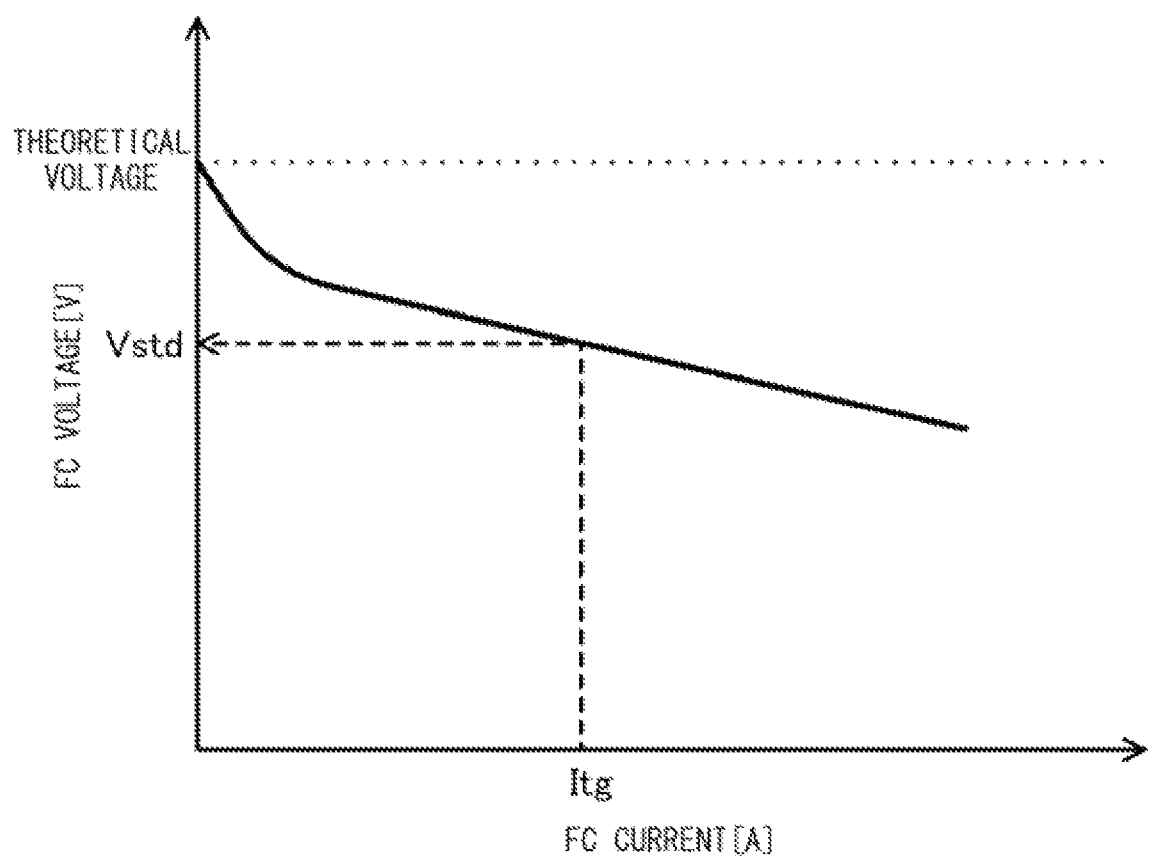

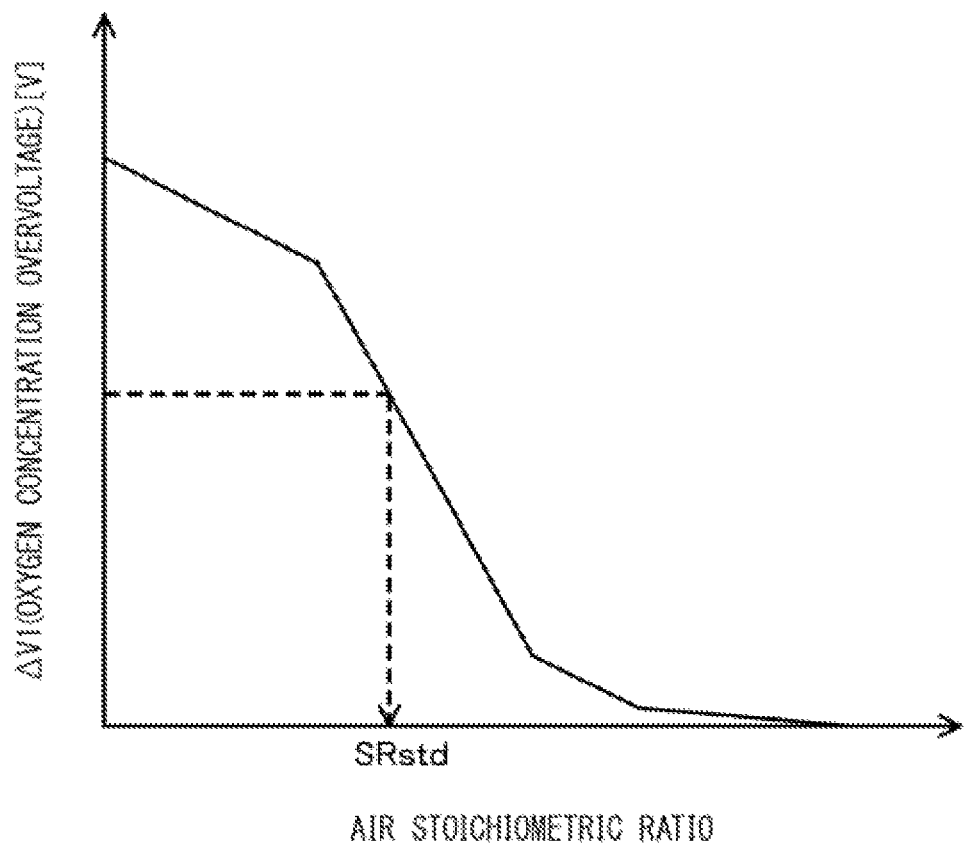

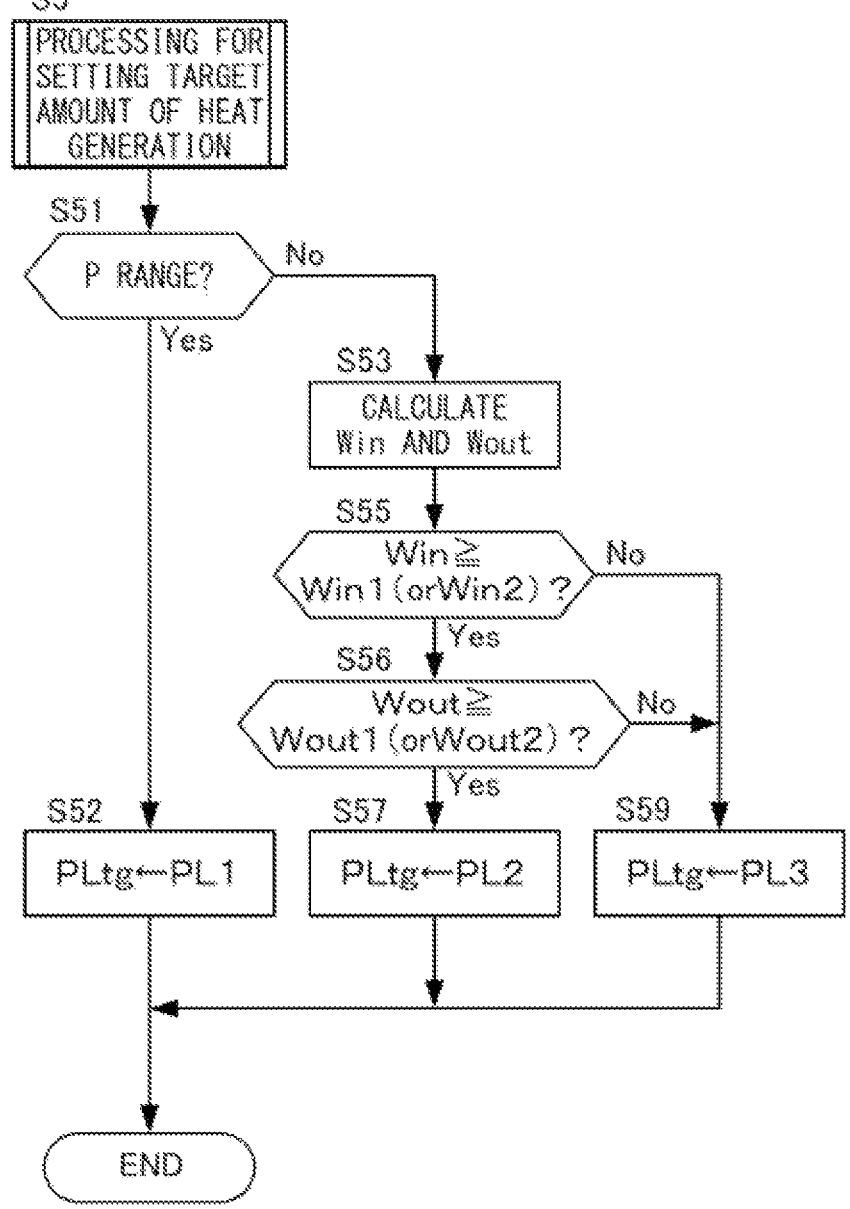

FUEL CELL SYSTEM AND CONTROL METHOD FOR FUEL CELL SYSTEM

FIELD

The present disclosure relates to a fuel cell system and a control method fora fuel cell system.

BACKGROUND

Japanese Unexamined Patent Publication No. 2008-269813 discloses, as a conventional fuel cell system, one which performs low efficiency power generation, where the power generation loss becomes greater than normal power generation, to thereby perform a rapid warmup operation making the amount of self heat generation of the fuel cell increase and making the fuel cell rapidly warm up.

SUMMARY

At the time of low efficiency power generation, to make the concentration overvoltage larger and make the power generation loss increase, assuming the same generated electric power, the flow rate of feed of the oxidizing agent gas to be supplied to the fuel cell becomes smaller than the time of normal power generation. That is, the target value of the air stoichiometric ratio set at the time of low efficiency power generation (ratio of flow rate of feed of oxidizing agent gas actually supplied to minimum flow rate of feed of oxidizing gas required for generating target generated electric power) becomes smaller than the target value of the air stoichiometric ratio set at the time of normal power generation. Further, at the time of low efficiency power generation, which is performed in a state where the air stoichiometric ratio is made smaller than the time of normal power generation, when the air stoichiometric ratio deviates from its target value, the extent of fluctuation of the voltage of the fuel cell tends to become greater than the time of normal power generation.

Here, at the time of transition where the target generated electric power changes, until the flow rate of feed of the oxidizing agent gas is controlled to a post-transition target flow rate, the air stoichiometric ratio will deviate from the post-transition target value. Therefore, at the time of low efficiency power generation, during transition, the actual voltage of the fuel cell will tend to greatly deviate from the target voltage. As a result, the actual generated electric power will tend to greatly deviate from the target generated electric power.

If the actual generated electric power becomes greater than the target generated electric power, the excess electric power at that time is charged to the battery. On the other hand, if the actual generated electric power becomes smaller than the target generated electric power, the insufficient amount of electric power at that time is discharged from the battery. For this reason, if the deviation of the actual generated electric power with respect to the target generated electric power becomes greater, the battery becomes overcharged in state or overdischarged in state and the battery is liable to deteriorate.

In this way, at the time of low efficiency power generation, at the time of transition, the actual generated electric power tends to greatly deviate with respect to the target generated electric power, so the battery becomes overcharged in state or overdischarged in state and the battery is liable to deteriorate.

The present disclosure was made focusing on such a problem point and has as its object to keep the battery from becoming an overcharged state or overdischarged state and the battery from deteriorating during a rapid warmup operation where low efficiency power generation is performed.

To solve this technical problem, the fuel cell system according to one aspect of the present disclosure comprises: a fuel cell configured to generate electric power by electrochemical reactions between a fuel gas and oxidizing agent gas; a rechargeable battery configured to be charged with excess electric power and discharge an insufficient amount of electric power at the time of electric power generation of the fuel cell; and a control device. The control device comprises: a feed flow rate control part controlling a flow rate of feed of oxidizing agent gas to be supplied to the fuel cell; and a power generation part performing low efficiency power generation in which the power generation loss becomes greater than normal power generation. The feed flow rate control part is configured to control the flow rate of feed of the oxidizing agent gas so that the amount of heat generation of the fuel cell accompanying power generation loss becomes a first amount of heat generation when, during performance of low efficiency power generation, the state of a mount on which the fuel cell system is mounted is a first mode; and control the flow rate of feed of the oxidizing agent gas so that the amount of heat generation becomes a second amount of heat generation smaller than the first amount of heat generation when, during performance of low efficiency power generation, the state of the mount is a second mode where the generated electric power of the fuel cell fluctuates more easily compared with the first mode.

Further, a control method for the fuel cell system according to one aspect of the present disclosure comprises: controlling the flow rate of feed of the oxidizing agent gas to be supplied to the fuel cell so that the amount of heat generation of the fuel cell accompanying power generation loss becomes a first amount of heat generation when, during performance of low efficiency power generation in which the power generation loss is greater than normal power generation, the state of a mount on which the fuel cell system is mounted is a first mode; and controlling the flow rate of feed of the oxidizing agent gas to be supplied to the fuel cell so that the amount of heat generation becomes a second amount of heat generation smaller than the first amount of heat generation when, during performance of low efficiency power generation, the state of the mount is a second mode where the generated electric power of the fuel cell fluctuates more easily compared with the first mode.

According to these aspect of the present disclosure, when the state of the mount is the second mode where the generated electric power of the fuel cell easily fluctuates, the power generation loss (the amount of heat generation) is made smaller, so the air stoichiometric ratio becomes relatively larger. Therefore, at the time of transition, the actual generated electric power can be kept from deviating from the target generated electric power, so during a rapid warming operation where low efficiency power generation is performed, the battery can be kept from becoming the overcharged state or overdischarged state and the battery can be kept from deteriorating.

BRIEF DESCRIPTION OF DRAWINGS

FIG. 9 is a standard IV characteristic map for calculating a standard FC voltage.

FIG. 10 is a map showing a relationship between the air stoichiometric ratio and the oxygen concentration overvoltage for calculating a standard air stoichiometric ratio.

FIG. 11 is a flow chart explaining details of processing for setting a target amount of heat generation according to another embodiment of the present disclosure.

DESCRIPTION OF EMBODIMENTS

Below, an embodiment of the present disclosure will be explained in detail with reference to the drawings. Note that, in the following explanation, similar component elements are assigned the same reference notations.

Figure 1:
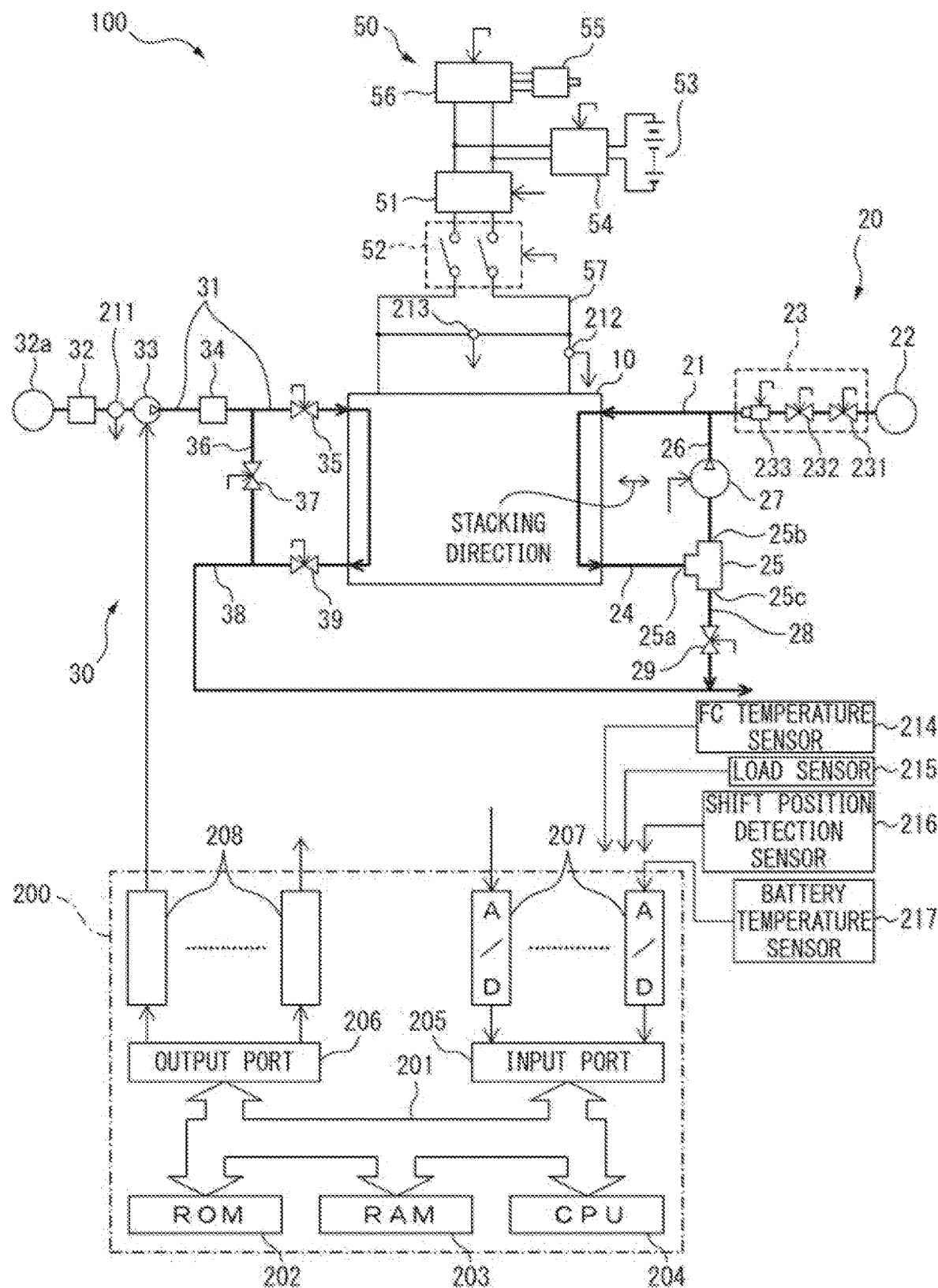
FIG. 1 is a schematic view of the configuration of a fuel cell system according to one embodiment of the present disclosure.

FIG. 1 is a schematic view of the configuration of a fuel cell system 100 according to one embodiment of the present disclosure mounted in a vehicle.

The fuel cell system 100 is provided with a fuel cell stack 10, a hydrogen feed device 20 for supplying hydrogen to the fuel cell stack 10 as an anode gas (fuel gas), an air feed device 30 for supplying air to the fuel cell stack 10 as a cathode gas (oxidizing agent gas), an electrical load part 50 electrically connected to an output terminal of the fuel cell stack 10, and an electronic control unit 200 for overall control of the various control parts of the fuel cell system 100.

The fuel cell stack 10 is comprised of a plurality of fuel cell unit cells (hereinafter referred to as "unit cells") stacked together along the stacking direction with the unit cells electrically connected in series. The unit cells are provided with MEA (membrane electrode assemblies).

Each MEA is comprised of a proton conducting ion exchange membrane formed by a solid polymer material (hereinafter referred to as a "electrolytic membrane") on one surface of which an anode electrode is formed and on the other surface a cathode electrode is formed—all of which are integrally joined. When electric power is being generated at the fuel cell stack 10, the following electrochemical reactions occur at the anode electrode and cathode electrode:

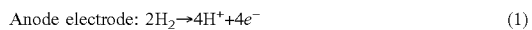

Anode electrode: $2H_2 \rightarrow 4H^+ + 4e^-$ (1)

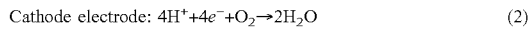

Cathode electrode: $4H^+ + 4e^- + O_2 \rightarrow 2H_2O$ (2)

The anode electrode and the cathode electrode are respectively provided with catalyst layers comprised of porous carbon materials in which a catalyst is supported. The catalyst layers contain platinum as a catalyst for promoting the electrochemical reactions between the hydrogen and oxygen (hydrogen oxidation reaction of formula (1) and oxygen reduction reaction of formula (2)). Note that, the two outer sides of the MEA may also further be provided with an anode gas diffusion layer and a cathode gas diffusion layer.

The hydrogen feed device 20 is provided with a hydrogen feed pipe 21, a high pressure hydrogen tank 22 as a hydrogen source, a hydrogen feed control part 23, an anode off-gas pipe 24, a gas-liquid separator 25, a hydrogen return pipe 26, a hydrogen recirculation pump 27, a purge pipe 28, and a purge control valve 29.

The hydrogen feed pipe 21 is a pipe through which hydrogen supplied to the fuel cell stack 10 flows. One end is connected to the high pressure hydrogen tank 22, while the other end is connected to the fuel cell stack 10.

The high pressure hydrogen tank 22 stores the hydrogen supplied through the hydrogen feed pipe 21 to the fuel cell stack 10 and in turn the anode electrodes of the unit cells.

The hydrogen feed control part 23 is provided with a main check valve 231, a regulator 232, and an injector 233.

The main check valve 231 is a solenoid valve which is opened and closed by the electronic control unit 200 and is provided at the hydrogen feed pipe 21. If the main check valve 231 is opened, hydrogen flows out from the high pressure hydrogen tank 22 to the hydrogen feed pipe 21. If the main check valve 231 is closed, the outflow of hydrogen from the high pressure hydrogen tank 22 is stopped.

The regulator 232 is provided at the hydrogen feed pipe 21 downstream from the main check valve 231. The regulator 232 is a pressure control valve able to be adjusted in opening degree continuously or in steps. Its opening degree is controlled by the electronic control unit 200. By controlling the opening degree of the regulator 232, the pressure of the hydrogen at the downstream side from the regulator 232, that is, the pressure of the hydrogen injected from the injector 233, is controlled.

The injector 233 is provided at the hydrogen feed pipe 21 downstream from the regulator 232. The injector 233 is, for example, a needle valve and is controlled to open and close by the electronic control unit 200. By controlling the opening time period of the injector 233, the flow rate of the hydrogen injected from the injector 233 is controlled.

In this way, using the hydrogen feed control part 23, the feed of hydrogen from the high pressure hydrogen tank 22 to the fuel cell stack 10 is controlled. That is, using the hydrogen feed control part 23, hydrogen controlled to the desired pressure and flow rate is supplied to the fuel cell stack 10.

The anode off-gas pipe 24 is a pipe through which anode off-gas which had flowed out from the fuel cell stack 10 flows. One end is connected to the fuel cell stack 10, while the other end is connected to a gas inflow port 25a of the gas-liquid separator 25. The anode off-gas is gas containing the excess hydrogen which was not used for the electrochemical reactions in each unit cell and the nitrogen and other inert gas and water content (liquid water and steam) which permeated from the cathode side through the MEA to the anode electrode side.

The gas-liquid separator 25 is provided with a gas inflow port 25a, a gas outflow port 25b, and a liquid water outflow port 25c. The gas-liquid separator 25 separates the water in the anode off-gas flowing from the gas inflow port 25a to the inside. Further, the gas-liquid separator 25 discharges the separated water from the liquid water outflow port 25c to a purge pipe 28 and discharges the anode off-gas containing hydrogen from which water was separated from the gas outflow port 25b to a hydrogen return pipe 26.

The hydrogen return pipe 26 is a pipe with one end connected to the gas outflow port 25b of the gas-liquid separator 25 and with the other end connected to the hydrogen feed pipe 21 downstream from the hydrogen feed control part 23. At the hydrogen return pipe 26, the anode off-gas discharged from the gas outflow port 25b of the gas-liquid separator 25 flows.

The hydrogen recirculation pump 27 is provided at the hydrogen return pipe 26. The hydrogen recirculation pump 27 is a pump for recirculating the hydrogen contained in the anode off-gas, that is, the excess hydrogen which was not used for the electrochemical reactions in each cell, by returning it to the hydrogen feed pipe 21. The hydrogen recirculation pump 27 pressurizes the anode off-gas discharged from the gas outflow port 25b of the gas-liquid separator 25 and pumps it to the hydrogen feed pipe 21.

The purge pipe 28 is a pipe with one end connected to the liquid water outflow port 25c of the gas-liquid separator 25 and with the other end connected to a later explained cathode off-gas pipe 38.

The purge control valve 29 is a solenoid valve which is opened and closed by the electronic control unit 200 and is provided at the purge pipe 28. The purge control valve 29 is usually closed and is periodically opened over short time periods. If the purge control valve 29 is opened, the water separated inside the gas-liquid separator 25 is discharged through the purge pipe 28 from the cathode off-gas pipe 38 to the outside.

In this way, the fuel cell system 100 according to the present embodiment is a hydrogen recirculation type of fuel cell system which recirculates the anode off-gas flowing out from the hydrogen passage 2 by returning it to the hydrogen feed pipe 21, but it may also be made a nonhydrogen recirculating type of fuel cell system in which the anode off-gas flowing out from the hydrogen passage 2 is not returned to the hydrogen feed pipe 21.

The air feed device 30 is provided with an air feed pipe 31, air cleaner 32, compressor 33, intercooler 34, cathode inlet valve 35, bypass pipe 36, distribution valve 37, cathode off-gas pipe 38, and cathode pressure control valve 39.

The air feed pipe 31 is a pipe through which air flows for supply to the fuel cell stack 10 and in turn the cathode electrode of each unit cell. One end is connected to the air cleaner 32, while the other end is connected to the fuel cell stack 10.

The air cleaner 32 removes the foreign matter in the air sucked into the air feed pipe 31. The air cleaner 32 is arranged in the atmosphere which serves as the oxygen source 32a. That is, the oxygen source 32a communicates with the air feed pipe 31 through the air cleaner 32.

The compressor 33, for example, is a centrifugal type or axial flow type of turbo compressor and is provided at the air feed pipe 31. The compressor 33 compresses and discharges the air sucked into the air feed pipe 31 through the air cleaner 32. Note that, at the air feed pipe 31 upstream from the compressor 33, a cathode flow rate sensor 211 is provided for detecting the flow rate of air sucked in and discharged by the compressor 33 (below, referred to as the "total air feed quantity") Qacp [NL/min].

The intercooler 34 is provided at the air feed pipe 31 downstream from the compressor 33 and cools the air discharged from the compressor 33 for example by the outside air stream or cooling water etc.

The cathode inlet valve 35 is a valve which is opened and closed by the electronic control unit 200 and is provided at the air feed pipe 31 downstream from the intercooler 34. The cathode inlet valve 35 is opened when it is necessary to supply air to the fuel cell stack 10.

The bypass pipe 36 is a pipe for making part or all of the air discharged from the compressor 33 directly flow into the later explained cathode off-gas pipe 38 without passing through the fuel cell stack 10 in accordance with need. The bypass pipe 36 is connected at one end to the air feed pipe 31 between the intercooler 34 and cathode inlet valve 35 and at the other end to the cathode off-gas pipe 38 downstream from the later explained cathode pressure control valve 39.

The distribution valve 37 is provided in the bypass pipe 36. The distribution valve 37 is a solenoid valve which can be adjusted in opening degree continuously or in steps. Its opening degree is controlled by the electronic control unit 200.

The cathode off-gas pipe 38 is a pipe through which cathode off-gas flowing out from the fuel cell stack 10 flows. One end is connected to the fuel cell stack 10, while the other end is opened to the atmosphere. The cathode off-gas is a gas containing the excess oxygen which was not used for the electrochemical reactions in each unit cell and the nitrogen or other inert gas and water content generated by the electrochemical reactions (liquid water or steam).

The cathode pressure control valve 39 is provided in the cathode off-gas pipe 38. The cathode pressure control valve 39 is a solenoid valve which can be adjusted in opening degree continuously or in steps. Its opening degree is controlled by the electronic control unit 200. By controlling the opening degree of the cathode pressure control valve 39, the pressure inside the fuel cell stack 10, that is, the cathode pressure, is controlled.

By controlling the compressor 33 and in turn the total air feed quantity Qafc and the respective opening degrees of the cathode inlet valve 35, distribution valve 37, and cathode pressure control valve 39, the flow rate Qfc [NL/min] of the air supplied to the fuel cell stack 10 in the air discharged from the compressor 33 (below, referred to as the "FC air feed quantity") is controlled.

The electrical load part 50 is provided with a first converter 51, circuit breaker 52, battery 53, second converter 54, motor-generator 55, and inverter 56.

At the connection line 57 between the electrical load part 50 and the output terminal of the fuel cell stack 10, a current sensor 212 for detecting the current Ifc [A] taken out from the fuel cell stack 10 (below, referred to as the "FC current") and a voltage sensor 213 for detecting the terminal voltage Vfc [V] of the output terminal of the fuel cell stack 10 (below, referred to as the "FC voltage") are provided.

The first converter 51 is a bidirectional DC/DC converter provided with an electrical circuit able to raise and lower the terminal voltage at the primary side terminal. The primary side terminal is connected to the output terminal of the fuel cell stack 10 while the secondary side terminal is connected to the DC side terminal of the inverter 56. The first converter 51 raises and lowers the FC output voltage Vfc becoming the primary side terminal voltage based on a control signal from the electronic control unit 200 and due to this controls the FC current Ifc to the target FC current Itg set according to the operating state of the fuel cell system 100.

The circuit breaker 52 is opened and closed by the electronic control unit 200 and electrically and physically connects or disconnects the fuel cell stack 10 and the electrical load part 50.

The battery 53, for example, is a nickel-cadmium storage battery, a nickel-hydrogen storage battery, a lithium ion battery, or other rechargeable secondary cell. The battery 53 is charged with excess electric power of the fuel cell stack 10 and regenerated electric power of the motor-generator 55. The electric power charged to the battery 53 is in accordance with need used for driving the motor-generator 55, compressor 33, and other various types of control parts which the fuel cell system 100 is provided with.

The second converter 54 is, for example, a bidirectional DC/DC converter provided with an electrical circuit able to raise and lower the terminal voltage of the secondary side terminal. Its primary side terminal is connected to the output terminal of the battery 53 while its secondary side terminal is connected to the DC side terminal of the inverter 56. The second converter 54 makes the input voltage of the inverter 56 becoming the terminal voltage of the secondary side rise and fall based on the control signal from the electronic control unit 200.

The motor-generator 55 is, for example, a three-phase permanent magnet type synchronous motor which is provided with a function as a motor for generating drive power of the vehicle in which the fuel cell system 100 is mounted and a function as a generator generating electric power at the time of deceleration of the vehicle. The motor-generator 55 is connected to the AC side terminal of the inverter 56 and is driven by the generated electric power of the fuel cell stack 10 and the electric power of the battery 53.

The inverter 56 is provided with an electric circuit able to convert DC current input from a DC side terminal to AC current based on a control signal from the electronic control unit 200 and output it from the AC side terminal and conversely able to convert AC current input from an AC side terminal to DC current based on a control signal from the electronic control unit 200 and output it from the DC side terminal. The DC side terminal of the inverter 56 is connected to the secondary side terminals of the first converter 51 and the second converter 54 while the AC side terminal of the inverter 56 is connected to the input and output terminal of the motor-generator 55. When making the motor-generator 55 function as a motor, the inverter 56 converts the DC current from the fuel cell stack 10 and the battery 53 to AC current (in the present embodiment, three-phase AC current) to supply it to the motor-generator 55. On the other hand, when making the motor-generator 55 function as a generator, the inverter 56 converts the AC current from the motor-generator 55 to DC current to supply it to the battery 53 etc.

The electronic control unit 200 is comprised of a digital computer provided with components connected to each other by a bidirectional bus 201 such as a ROM (read only memory) 202, RAM (random access memory) 203, CPU (microprocessor) 204, input port 205, and output port 206.

At the input port 205, output signals of not only the above-mentioned cathode flow rate sensor 211 or current sensor 212 or voltage sensor 213, but also an FC temperature sensor 214 for detecting the temperature Tfc [° C.] of the fuel cell stack 10 (below, referred to as the "FC temperature"), a load sensor 215 for detecting an amount of depression of an accelerator pedal (below, referred to as the "amount of accelerator depression"), a shift position detection sensor 216 for detecting a shin range (position of shift bar) selected by the driver of the vehicle, a battery temperature sensor 217 for detecting a temperature Tvat of the battery 53 (below, referred to as the "battery temperature"), etc. are input through corresponding AD converters 207.

At the output port 206, the hydrogen feed control part 23 (main check valve 231, regulator 232, and injector 233) and the hydrogen recirculation pump 27, purge control valve 29, compressor 33, cathode inlet valve 35, distribution valve 37, cathode pressure control valve 39, first converter 51, circuit breaker 52, second converter 54, inverter 56, and other control parts are electrically connected through corresponding drive circuits 208.

The electronic control unit 200 outputs control signals from the output port 206 for controlling the control parts based on the output signals of various sensors input to the input port 205 to control the fuel cell system 100. Below, the control of the fuel cell system 100 which the electronic control unit 200 performs, in particular the control of the FC air feed quantity Qfc during the rapid warmup operation at the time of startup of the fuel cell system 100 below the freezing point, will be explained.

Figure 2:
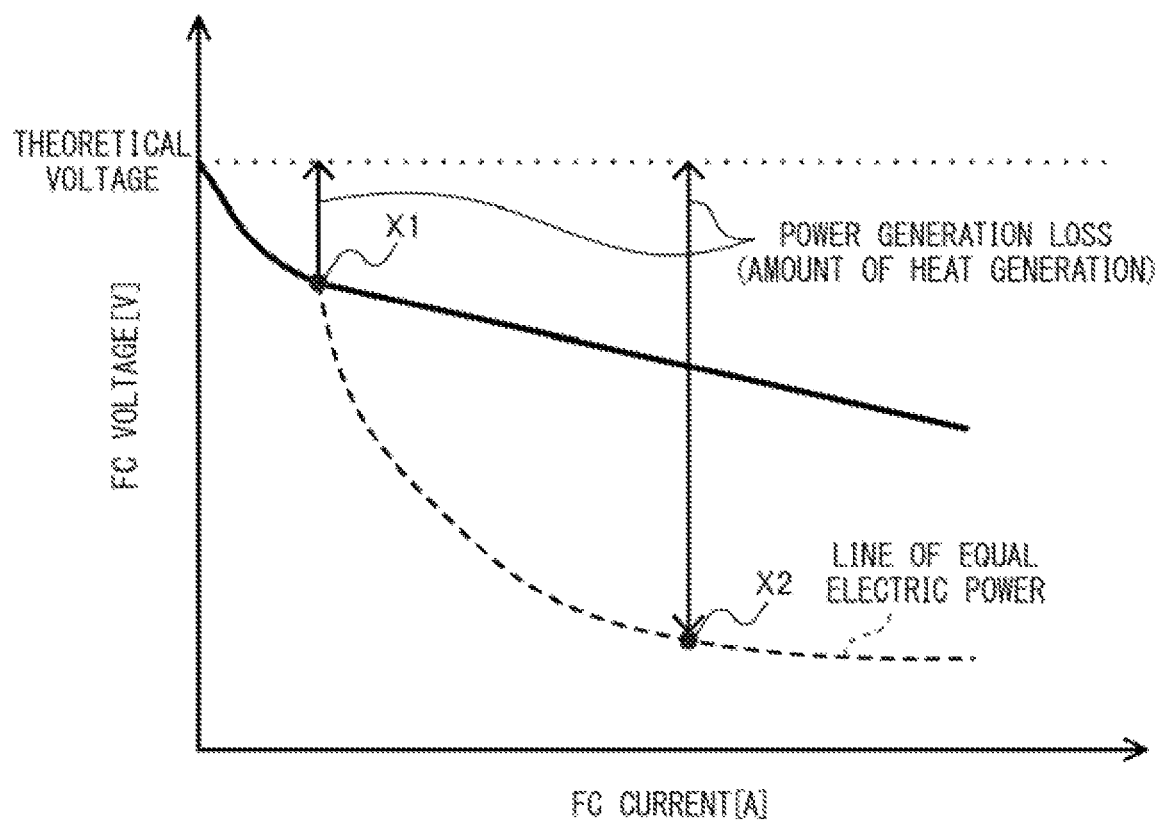
FIG. 2 is a view showing a standard IV characteristic for a fuel cell stack when an FC temperature is a certain temperature.

FIG. 2 is a view showing a current-voltage characteristic (below, referred to as the "standard IV characteristic") serving as a standard for a fuel cell stack 10 when a stack temperature Tfc is a certain temperature. The standard IV characteristic is the IV characteristic when performing high efficiency power generation suppressing various types of power generation loss occurring at the time of power generation (normal power generation).

The electronic control unit 200 calculates the target generated electric power Ptg [kW] of the fuel cell stack 10 based on the operating state of the fuel cell system 100. In the present embodiment, the electronic control unit 200 calculates the total value of requested electric power of the motor-generator 55 calculated based on the amount of accelerator depression etc. and the requested electric powers of the compressor 33 and other auxiliaries as the target generated electric power Ptg.

Further, as shown in FIG. 2, at the time of normal operation performing high efficiency power generation after the fuel cell stack 10 finishes warming up, the electronic control unit 200 controls the air stoichiometric ratio and in turn the FC air feed quantity Qfc so that the operating point X defined by the FC current Ifc and FC voltage Vfc becomes a normal operating point X1 able to generate the target generated electric power Ptg on the standard IV characteristic.

The "air stoichiometric ratio" is the ratio of the actual FC air feed quantity Qfc with respect to the minimum FC air feed quantity Qth required for generating the target generated electric power Ptg (below, referred to as the "theoretical FC air feed quantity"). Therefore, as the air stoichiometric ratio (=Qfc/Qth) becomes greater than 1.0, the actual FC air feed quantity Qfc becomes greater than the theoretical FC air feed quantity Qth.

Figure 3:
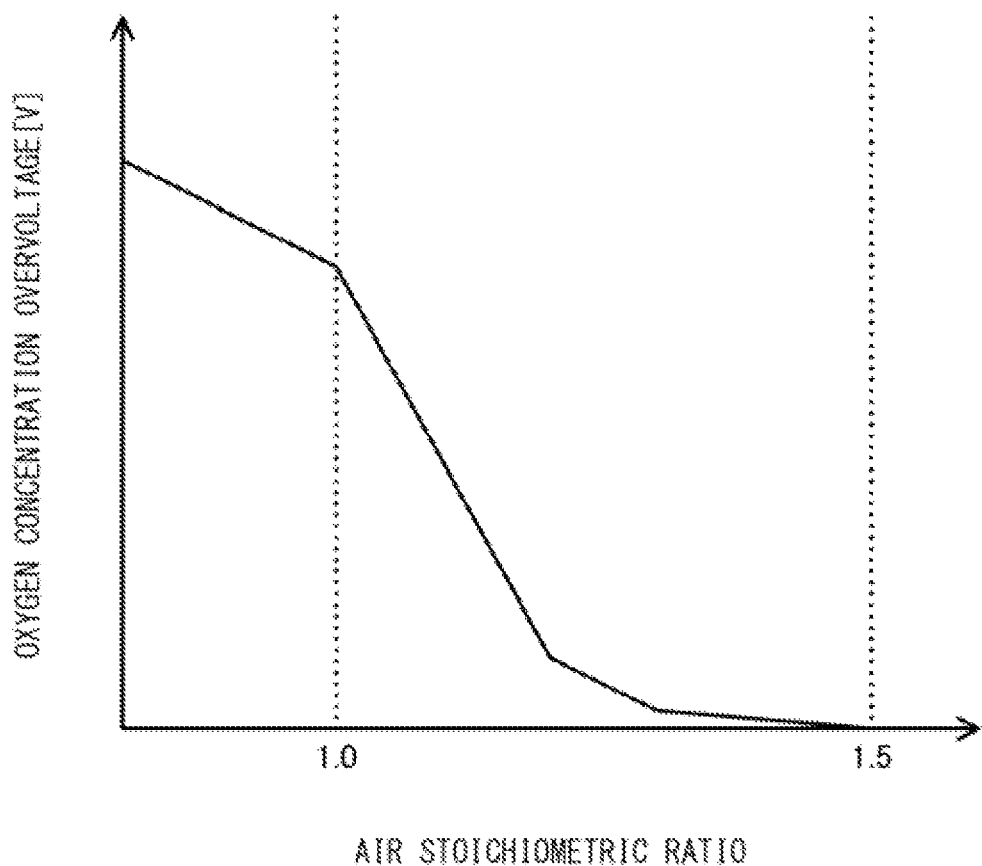
FIG. 3 is a view explaining a relationship of an air stoichiometric ratio and oxygen concentration overvoltage of one factor of power generation loss.

FIG. 3 is a view explaining a relationship of an air stoichiometric ratio and oxygen concentration overvoltage of one factor of power generation loss (power generator loss occurring due to insufficient oxygen at time of power generation).

As shown in FIG. 3, the oxygen concentration overvoltage tends to become larger when the air stoichiometric ratio is small compared to when it is large. In other words, the power generation loss due to the oxygen concentration overvoltage (amount of voltage drop) tends to become larger when the air stoichiometric ratio is small compared to when it is large.

Therefore, at the time of normal operation, the electronic control unit 200 controls the FC air feed quantity Qfc so that the air stoichiometric ratio becomes an air stoichiometric ratio in a normal region where the oxygen concentration overvoltage can be substantially ignored (in the example shown in FIG. 3, for example, an air stoichiometric ratio near 1.5) so as to perform high efficiency power generation kept down in power generation loss.

On the other hand, when starting up and operating a fuel cell system 100 in an environment below the freezing point, the electronic control unit 200 performs a rapid warmup operation so as to keep the water generated along with power generation from freezing while enabling the IV characteristic, which worsens the lower the temperature at the time, to be quickly restored. A rapid warmup operation is a method of operation in which the FC air feed quantity Qfc is controlled to make the oxygen concentration overvoltage increase from the time of normal operation to intentionally make the power generation loss increase and thereby make the amount of self heat generation of the fuel cell stack 10 increase to promote warmup.

At the time of a rapid warmup operation, the electronic control unit 200 controls the FC air feed quantity Qfc so that the air stoichiometric ratio becomes an air stoichiometric ratio in a rapid warmup region where the oxygen concentration overvoltage can no longer be ignored (in the example shown in FIG. 3, for example, an air stoichiometric ratio near 1.0) so as to perform low efficiency power generation generating the target generated electric power Ptg while making the power generation loss (amount of self heat generation) increase over normal operation.

Due to this, compared with the case in FIG. 2 of performing high efficiency power generation (normal power generation) at the normal operating point X1 on the standard IV characteristic, it is possible to make the FC voltage Vfc drop by exactly the amount of the oxygen concentration overvoltage corresponding to the air stoichiometric ratio. That is, by controlling the FC current Ifc while suitably controlling the air stoichiometric ratio and in turn the FC air feed quantity Qfc, as shown in FIG. 2, it is possible to generate electric power at the normal operating point X1 and the rapid warmup operating point X2 making the power generation loss increase from the normal operating point X1 and giving the desired amount of self heat generation on the line of equal power (see broken line), so it is possible to promote warmup of the fuel cell stack 10.

Here, as a result of intensive research by the inventors, it was learned that during this rapid warmup operation, a difference tends to easily arise between the target generated electric power Ptg and the actual generated electric power Pfc and, as a result, the battery charged and discharged electric powers are liable to become larger and cause deterioration of the battery. Below, this problem point will be explained while referring to FIG. 4 in addition to FIG. 3. Note that, FIG. 4 is a view showing changes in the FC voltage Vfc when making the air stoichiometric ratio change (that is, when making the FC air feed quantity Qfc change) while maintaining the FC current Ifc constant.

As shown in FIG. 3, if comparing the amount of change of the oxygen concentration overvoltage when the air stoichiometric ratio changes by exactly a predetermined amount, it tends to become larger when the air stoichiometric ratio is small compared to when it is large. In other words, compared to when the air stoichiometric ratio is large, when it is small, the amount of drop of voltage and in turn the FC voltage Vfc tends to become easier to fluctuate when the air stoichiometric ratio changes.

Figure 4:
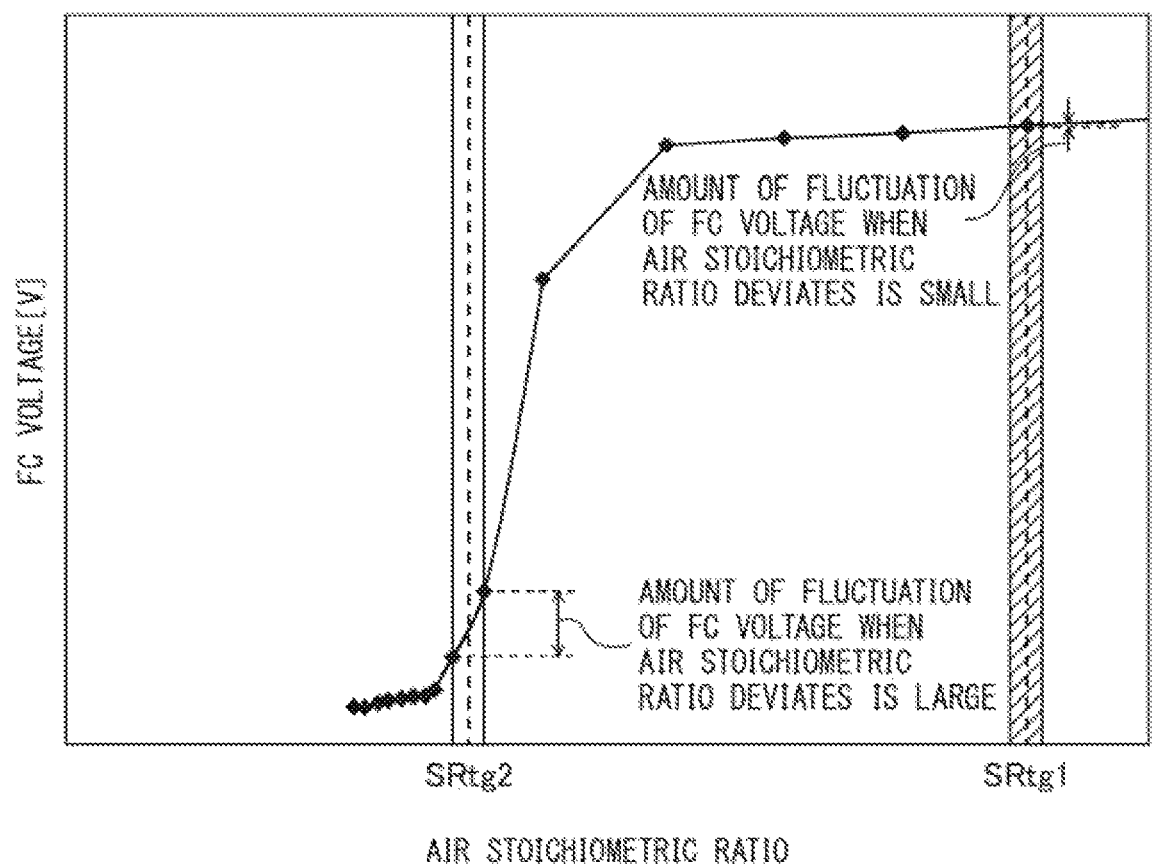
FIG. 4 is a view showing changes in an FC voltage when making an air stoichiometric ratio change in a state maintaining an FC current constant.

For this reason, as shown in FIG. 4, for example, at the time of normal operation where the FC air feed quantity Qfc is controlled so that the air stoichiometric ratio becomes a certain target air stoichiometric ratio SRtg1 in a normal region where the above-mentioned oxygen concentration overvoltage can be substantially ignored, even if the FC air feed quantity Qfc fluctuates and the air stoichiometric ratio deviates from the target air stoichiometric ratio SRtg1, the amount of fluctuation of the FC voltage Vfc is small.

As opposed to this, for example, at the time of a rapid warmup operation where the FC air feed quantity Qfc is controlled so that the air stoichiometric ratio becomes a certain target air stoichiometric ratio SRtg2 in the rapid warmup region where the above-mentioned oxygen concentration overvoltage can no longer be ignored, if the FC air feed quantity Qfc fluctuates and the air stoichiometric ratio deviates from the target air stoichiometric ratio SRtg2, the FC voltage Vfc greatly fluctuates even if the extent of deviation from the time of normal operation were the same.

In this way, when, during a rapid warmup operation, the air stoichiometric ratio deviates from the target air stoichiometric ratio, the amount of fluctuation of the FC voltage Vfc tends to become larger than the time of normal power generation.

Further, at a time of transition when the target generated electric power Ptg changes in steps, until the FC air feed quantity Qfc is controlled to the post-transition target air feed quantity Qtg, the air stoichiometric ratio will deviate from the post-transition target air stoichiometric ratio. For this reason, during a rapid warmup operation, in particular at a time of transition, the FC voltage Vfc tends to greatly deviate from the target FC voltage Vtg. As a result, the actual generated electric power Pfc tends to greatly deviate from the target generated electric power Ptg.

If the actual generated electric power Pfc becomes larger than the target generated electric power Ptg, the excess electric power at that time is charged to the battery 53. For this reason, if the excess electric power becomes greater, the charged electric power of the battery 53 is liable to become equal to or greater than the allowable charged electric power Win [kW] set according to the battery state for keeping the battery 53 from deteriorating and the battery 53 to be made to deteriorate. In particular, when using a lithium ion battery as the battery 53, if the excess electric power becomes larger, so-called "lithium deposition" where lithium deposits on the negative electrode surface of the battery 53 is liable to occur.

Further, if the actual generated electric power Pfc becomes smaller than the target generated electric power Ptg, the insufficient amount of electric power at that time is output from the battery 53. For this reason, if the insufficient amount of electric power becomes greater, the discharged electric power of the battery 53 is liable to become equal to or greater than the allowable discharged electric power Wout [kW] set in accordance with the state of the battery to keep the battery 53 from deteriorating in the same way as the allowable charged electric power Win and the battery 53 to be made to deteriorate.

Note that, in the present embodiment, the charged electric power of the battery 53 is a positive value which becomes larger in value the larger the electric power charged to the battery 53. Further, the discharged electric power of the battery 53 similarly is a positive value which becomes larger in value the larger the electric power discharged from the battery 53.

Further, the allowable charged electric power Win and the allowable discharged electric power Wout change in accordance with the battery state. For example, they tend to become smaller when the temperature of the battery 53 is low compared to when it is high. For this reason, during a rapid warmup operation, which basically is performed in an environment below the freezing point, since the temperature of the battery 53 is also low, the allowable charged electric power Win and the allowable discharged electric power Wout also tend to become smaller than at the time of normal operation. Therefore, during a rapid warmup operation, if deviation occurs between the actual generated electric power Pfc and the target generated electric power Ptg, in particular the battery 53 easily becomes an overcharged state or overdischarged state and the battery 53 easily deteriorates.

Therefore, in the present embodiment, the target amount of heat generation PLtg [W] during a rapid warmup operation is changed based on the state of the vehicle on which the fuel cell system 100 is mounted and the state of the battery.

Specifically, if the state of the vehicle is a first state (first mode) where the parking range (below, referred to as the "P range") is selected as the shift range, the target amount of heat generation PLtg during a rapid warmup operation is set to a predetermined first amount of heat generation PL1 largest in the amount of heat generation.

Further, if the state of the vehicle is a first state (first mode) where the parking range (below, referred to as the "P range") is selected as the shift range, the target amount of heat generation PLtg during a rapid warmup operation is set to a predetermined first amount of heat generation PL1 largest in the amount of heat generation. If the state of the vehicle is a second state (second mode) where the drive range (below, referred to as the "D range") or the reverse range (below, referred to as the "R range") is selected as the shift range, the target amount of heat generation PLtg during a rapid warmup operation is set to a predetermined second amount of heat generation PL2 smaller in the amount of heat generation than the first amount of heat generation PL1.

This is due to the following reason. That is, the larger the value the target amount of heat generation PLtg during a rapid warmup operation is set to, the smaller the air stoichiometric ratio has to be made to make the oxygen concentration overvoltage larger and make the power generation loss increase. For this reason, the larger the value the target amount of heat generation PLtg during rapid warmup operation is set to, in particular at the time of transition, the easier it is for deviation to occur between the actual generated electric power Pfc and the target generated electric power Ptg.

Further, when the P range is selected as the shift range and the vehicle is in a parked state, basically the accelerator pedal is never depressed, so the frequency of the target generated electric power Ptg changing and entering a transitional state becomes smaller or even if changing, the amount of change is also small. On the other hand, when the D range or R range is selected as the shift range, basically the accelerator pedal is depressed, so the target generated electric power Ptg changes, the frequency of the transitional state being entered becomes greater, or the amount of change becomes larger.

Therefore, in the present embodiment, when the P range is selected as the shift range, the target amount of heat generation PLtg is set to a first amount of heat generation PL1 with the largest amount of heat generation, while when the D range or R range is selected as the shift range, the target amount of heat generation PLtg is set to a second amount of heat generation PL2 with a smaller amount of heat generation than the first amount of heat generation PL1.

Due to this, when the shift range is the P range, the amount of heat generation can be made larger and the fuel cell stack 10 can be warmed up quickly. Further, when the shift range is switched to the D range or the R range, the amount of heat generation can be kept down to a certain extent to thereby promote warmup of the fuel cell stack 10 while keeping deviation from occurring between the actual generated electric power Pfc and the target generated electric power Ptg to keep the battery 53 from becoming an overcharged state or overdischarged state.

Further, if the D range or R range is selected as the shift range, when the allowable charged electric power Win and allowable discharged electric power Wout of the battery 53 determined in accordance with the state of the battery respectively become smaller, if deviation arises between the actual generated electric power Pfc and the target generated electric power Ptg, the battery 53 easily becomes an overcharged state or overdischarged state. For this reason, in the present embodiment, if the D range or R range is selected as the shift range, when the allowable charged electric power Win and allowable discharged electric power Wout of the battery 53 respectively become less than a charging side threshold value and a discharging side threshold value, the target amount of heat generation PLtg during the rapid warmup operation is set to a predetermined third amount of heat generation PL3 with an amount of heat generation further smaller than the second amount of heat generation PL2.

Due to this, when the battery 53 easily becomes an overcharged state or overdischarged state, the amount of heat generation is further suppressed and deviation between the actual generated electric power Pfc and the target generated electric power Ptg can be further kept from occurring.

Therefore, in the present embodiment, the first amount of heat generation PL is set to an amount of heat generation (for example, 50 kW to 60 kW) where the air stoichiometric ratio becomes a value close to 1.0 so as to make the oxygen concentration overvoltage larger to make the power generation loss increase and thereby promote warmup.

Further, the third amount of heat generation PL3 is set to an amount of heat generation (for example, 5 kW to 10 kW) where the air stoichiometric ratio becomes an air stoichiometric ratio close to the air stoichiometric ratio at the time of normal operation (for example, close to 1.5) so as to keep down the amount of fluctuation of the FC voltage Vfc when the air stoichiometric ratio has deviated from the target air stoichiometric ratio and thereby keep the battery 53 from becoming an overcharged state or overdischarged state.

Further, the second amount of heat generation PL2 is set to an amount of heat generation (for example, 20 kW to 30 kW) approximately midway of the first amount of heat generation PL1 and the third amount of heat generation PL3 considering the balance of both of promotion of warmup and suppression of deterioration due to overcharging or overdischarging of the battery 53.

Below, referring to FIG. 5, control of the FC air feed quantity Qfc during a rapid warmup operation according to the present embodiment, including processing for setting the target amount of heat generation PLtg during a rapid warmup operation, will be explained.

Figure 5:
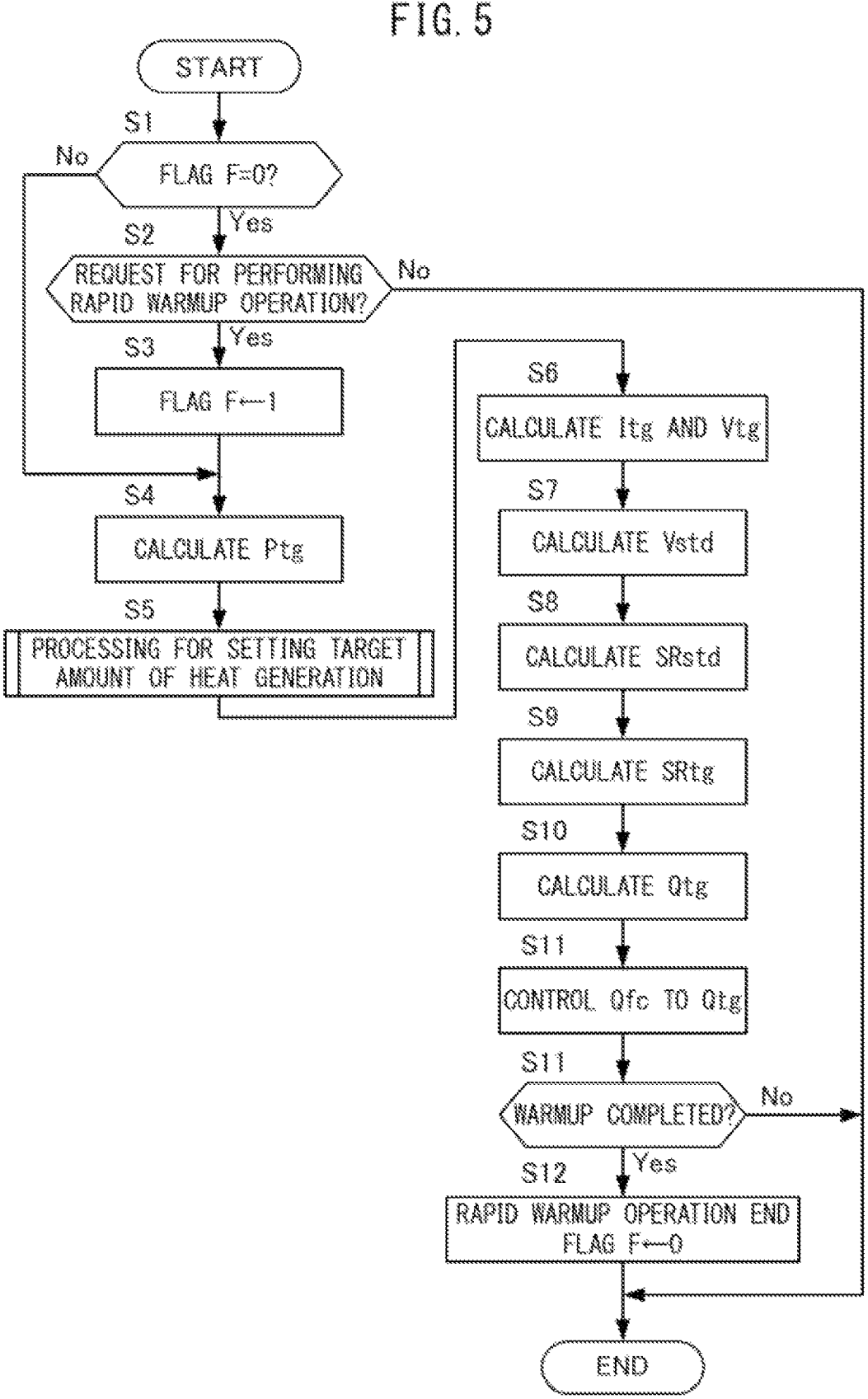
FIG. 5 is a flow chart explaining control of an FC air feed quantity during a rapid warmup operation according to one embodiment of the present disclosure.

FIG. 5 is a flow chart explaining control of the FC air feed quantity Qfc during a rapid warmup operation according to the present embodiment. The electronic control unit 200 repeatedly performs the present routine by a predetermined processing period (for example, 10 ms).

At step S1, the electronic control unit 200 judges if the rapid warmup flag F has been set to 0. The rapid warmup flag F is a flag with an initial value which is set to 0. It is a flag which is set to 1 at the time of start of the rapid warmup operation and is returned to 0 at the time of end of the rapid warmup operation. The electronic control unit 200 proceeds to the processing of step S2 if the rapid warmup flag F is 0. On the other hand, the electronic control unit 200 proceeds to the processing of step S4 if the rapid warmup flag F is 1.

At step S2, the electronic control unit 200 judges if there has been a request for performing a rapid warmup operation. In the present embodiment, the electronic control unit 200 judges that there has been a request for performing a rapid warmup operation if it is the time of startup of the fuel cell system 100 and the FC temperature is equal to or less than a predetermined rapid warmup request temperature (for example 0° C.). The electronic control unit 200 proceeds to the processing of step S3 when judging there has been a request for performing a rapid warmup operation. On the other hand, the electronic control unit 200 ends the current processing when judging there has not been a request for performing a rapid warmup operation.

At step S3, the electronic control unit 200 sets the rapid warmup flag F to 1.

At step S4, the electronic control unit 200 calculates the target generated electric power Ptg of the fuel cell stack 10 based on the operating state of the fuel cell system 100. In the present embodiment, the electronic control unit 200, as explained above, calculates the total value of the required electric power of the motor-generator 55 and the required electric power of the compressor 33 and other various auxiliaries as the target generated electric power Ptg.

At step S5, the electronic control unit 200 performs processing for setting the target amount of heat generation PLtg. To facilitate understanding of the disclosure, before explaining the processing of step S6 and on, first the processing for setting the target amount of heat generation PLtg will be explained with reference to FIG. 6.

Figure 6:
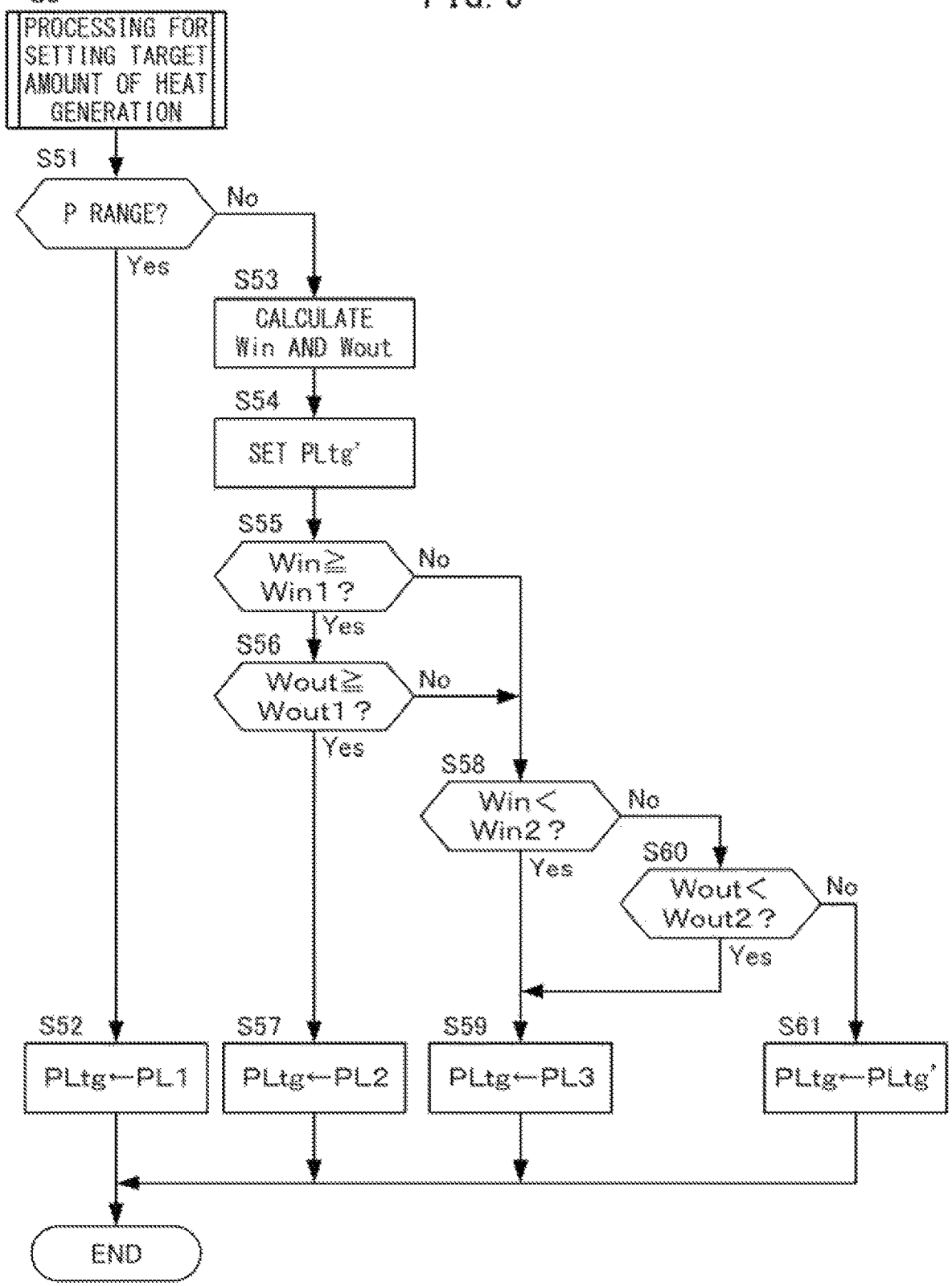
FIG. 6 is a flow chart explaining details of processing for setting a target amount of heat generation.

FIG. 6 is a flow chart explaining details of the processing for setting the target amount of heat generation PLtg.

At step S51, the electronic control unit 200 judges if the shift range of the vehicle is the P range. The electronic control unit 200 proceeds to the processing of step S52 if the shift range of the vehicle is the P range. On the other hand, the electronic control unit 200 proceeds to the processing of step S53 if the shift range of the vehicle is a range other than the P range (for example, the D range or R range).

At step S52, the electronic control unit 200 sets the target amount of heat generation PLtg to the first amount of heat generation PL1.

At step S53, the electronic control unit 200 calculates the allowable charged electric power Win and allowable discharged electric power Wout based on the state of the battery 53. In the present embodiment, the electronic control unit 200 calculates the allowable charged electric power Win and allowable discharged electric power Wout based on the battery temperature Tvat. As explained above, the allowable charged electric power Win and the allowable discharged electric power Wout tend to become smaller when the battery temperature Tvat is high compared to when it is low. Note that, in calculating the allowable charged electric power Win and the allowable discharged electric power Wout, in addition to the battery temperature Tvat, for example the state of charge of the battery may also be considered.

At step S54, the electronic control unit 200 sets the provisional target amount of heat generation PLtg'. The provisional target amount of heat generation PLtg' is basically set to the previous value of the target amount of heat generation PLtg, but if the previous value of the target amount of heat generation PLtg was the first amount of heat generation PL1, in the present embodiment, it is set to the third amount of heat generation PL3.

At step S55, the electronic control unit 200 judges if the allowable charged electric power Win is equal to or greater than a predetermined first charging side threshold value Win1. The electronic control unit 200 proceeds to the processing of step S56 if the allowable charged electric power Win is equal to or greater than the first charging side threshold value Win1. On the other hand, the electronic control unit 200 proceeds to the processing of step S58 if the allowable charged electric power Win is less than the first charging side threshold value Win1.

At step S56, the electronic control unit 200 judges if the allowable discharged electric power Wout is equal to or greater than a predetermined first discharging side threshold value Wout1. The electronic control unit 200 proceeds to the processing of step S57 if the allowable discharged electric power Wout is equal to or greater than the first discharging side threshold value Wout1. On the other hand, the electronic control unit 200 proceeds to the processing of step S58 if the allowable discharged electric power Wout is less than the first discharging side threshold value Wout1.

At step S57, the electronic control unit 200 sets the target amount of heat generation PLtg to the second amount of heat generation PL2.

At step S58, the electronic control unit 200 judges if the allowable charged electric power Win is less than a predetermined second charging side threshold value Win2 smaller than the first charging side threshold value Win1. The electronic control unit 200 proceeds to the processing of step S59 if the allowable charged electric power Win is less than the second charging side threshold value Win2. On the other hand, the electronic control unit 200 proceeds to the processing of step S60 if the allowable charged electric power Win is equal to or greater than the second charging side threshold value Win2.

At step S59, the electronic control unit 200 sets the target amount of heat generation PLtg to the third amount of heat generation PL3.

At step S60, the electronic control unit 200 judges if the allowable discharged electric power Wout is less than a predetermined second discharging side threshold value Wout2 smaller than the first discharging side threshold value Wout1. The electronic control unit 200 proceeds to the processing of step S59 if the allowable discharged electric power Wout is less than the second discharging side threshold value Wout2. On the other hand, the electronic control unit 200 proceeds to the processing of step S61 if the allowable discharged electric power Wout is equal to or greater than the second discharging side threshold value Wout2.

At step S61, the electronic control unit 200 sets the target amount of heat generation PLtg to a provisional target amount of heat generation PLtg'.

In this way, in the present embodiment, when the shift range of the vehicle is a range other than the P range (for example, the D range or R range), if the allowable charged electric power Win is equal to or greater than the first charging side threshold value Win1 and the allowable discharged electric power Wout is equal to or greater than the first discharging side threshold value Wout1, the target amount of heat generation PLtg is set to the second amount of heat generation PL2. Further, if the allowable charged electric power Win is less than the second charging side threshold value Win2 or if the allowable discharged electric power Wout is less than the second discharging side threshold value Wout2, the target amount of heat generation PLtg is set to the third amount of heat generation PL3.

Figure 7:
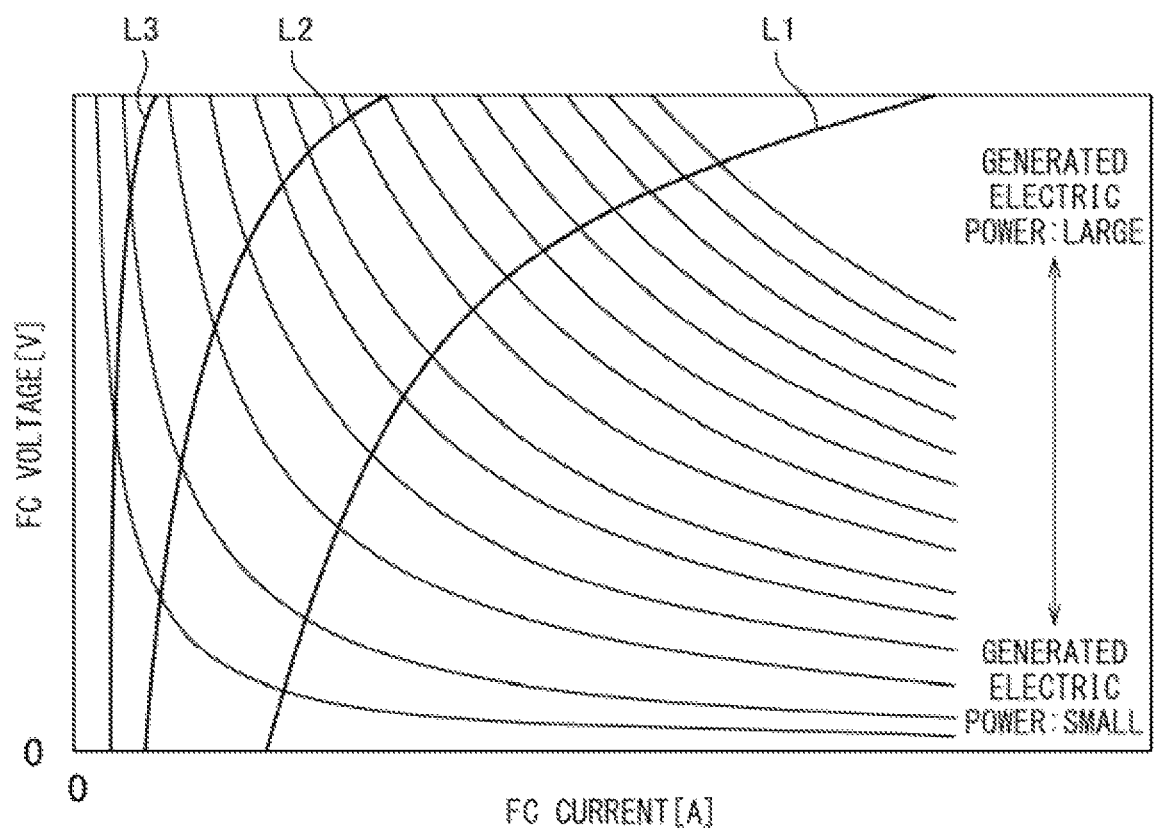
FIG. 7 is an IV characteristic map in which lines of equal power and a line of equal heat generation are drawn for calculating a rapid warmup operating point X2.

Returning to FIG. 5, at step S6, the electronic control unit 200 refers to the IV characteristic map shown in FIG. 7 in which lines of equal power (see fine solid lines) and a line of equal heat generation (see thick solid line) are drawn and calculates the rapid warmup operating point X2, that is, target FC current Itg [A] and target FC voltage Vtg [V], based on the target generated electric power Ptg and the target amount of heat generation PLtg [kW].

Figure 8:
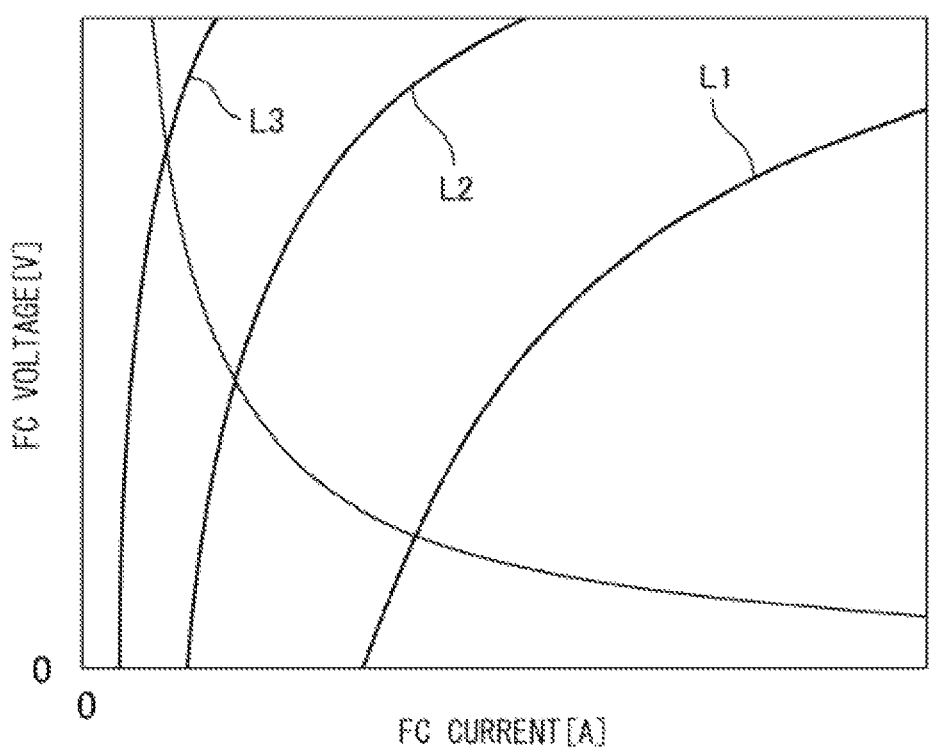
FIG. 8 is a view explaining a method of calculation of the rapid warmup operating point X2.

Specifically, the electronic control unit 200, as shown in FIG. 8, selects the line of equal power enabling generation of the target generated electric power Ptg from among the lines of equal power and calculates the point at which the selected line of equal power and line of equal heat generation enabling the amount of heat generation to be made the target amount of heat generation PLtg on the IV characteristic map intersect as the rapid warmup operating point X2.

Note that in FIG. 7 and FIG. 8, the line of equal heat generation L1 is the line of equal heat generation enabling the amount of heat generation to be made the first amount of heat generation PL1, the line of equal heat generation L2 is the line of equal heat generation enabling the amount of heat generation to be made the second amount of heat generation PL2, and the line of equal heat generation L3 is the line of equal heat generation enabling the amount of heat generation to be made the third amount of heat generation PL3.

At step S7, the electronic control unit 200 refers to the standard IV characteristic map shown in FIG. 9 to calculate the FC voltage (below, referred to as the "standard FC voltage") Vstd when controlling the FC current Ifc to the target FC current Itg on the standard IV characteristic. The standard FC voltage Vstd, in other words, is the FC voltage when performing high efficiency power generation (normal power generation) to control the FC current Ifc to the target FC current Itg.

Note that the standard IV characteristic changes in accordance with the FC temperature Tfc, so a plurality of standard IV characteristic maps are prepared for each FC temperature. Therefore, the electronic control unit 200 refers to the optimal standard IV characteristic map corresponding to the current FC temperature Tfc from among the plurality of standard IV characteristic maps to calculate the standard FC voltage Vstd.

At step S8, the electronic control unit 200 refers to a map showing the relationship between the air stoichiometric ratio and oxygen concentration overvoltage and shown in FIG. 10 similar to FIG. 3 and calculates the standard air stoichiometric ratio SRstd based on the difference $\Delta V1$ (=Vstd−Vtg) between the standard FC voltage Vstd and the target FC voltage Vtg (that is, the oxygen concentration overvoltage required for generating the standard FC voltage Vstd so as to make it fall to the target FC voltage Vtg).

At step S9, the electronic control unit 200 calculates the feedback correction value for the standard air stoichiometric ratio SRstd based on the deviation $\Delta V2$ (=Vtg−Vfc) between the target FC voltage Vtg and FC voltage Vfc (below, referred to as the "FC voltage deviation") and adds that feed correction value to the standard air stoichiometric ratio SRstd to calculate the target air stoichiometric ratio SRtg.

At step S10, the electronic control unit 200 multiplies the target air stoichiometric ratio SRtg with the theoretical FC air feed quantity Qth required for generating the target generated electric power Ptg to thereby calculate the target FC air feed quantity Qtg.

At step S11, the electronic control unit 200 controls the first converter 51 to control the FC current Ifc to the target FC current Itg and control the FC air feed quantity Qfc to the target air feed quantity Qtg. In the present embodiment, the electronic control unit 200 controls the compressor so that the total air feed quantity Qafc becomes constant and controls the opening degree of the distribution valve 37 and cathode pressure control valve to thereby control the FC air feed quantity Qfc to the target air feed quantity Qtg.

By controlling the FC current Ifc to the target FC current Itg and controlling the FC air feed quantity Qfc to the target air feed quantity Qtg in this way, the FC voltage Vfc is controlled to the target FC voltage Vtg and the operating point X is controlled to the rapid warmup operating point X2.

At step S12, the electronic control unit 200 judges if warmup of the fuel cell stack has been completed. In the present embodiment, the electronic control unit 200 judges if the FC temperature Tfc has become equal to or greater than a predetermined rapid warmup completion temperature (for example 70° C.). The electronic control unit 200 proceeds to the processing of step S13 if the FC temperature Tfc is equal to or greater than the rapid warmup completion temperature. On the other hand, the electronic control unit 200 ends the current processing if the FC temperature Tfc is less than the rapid warmup completion temperature.

At step S13, the electronic control unit 200 ends the rapid warmup operation and returns the rapid warmup flag F to 0.

The fuel cell system 100 according to the present embodiment explained above is provided with a fuel cell stack 10 (fuel cell) generating electric power by electrochemical reactions between hydrogen as the fuel gas and air as the oxidizing agent gas, a battery 53 (rechargeable battery) charged with excess electric power and discharging the insufficient amount of electric power at the time of power generation of the fuel cell stack 10, and an electronic control unit 200 (control device). The electronic control unit 200 is provided with a feed flow rate control part configured to control the flow rate of feed of air supplied to the fuel cell stack 10 (FC air feed quantity Qfc) and a power generation part configured to perform low efficiency power generation where the power generation loss becomes greater compared with normal power generation.

Further, when the state of the vehicle in which the fuel cell system 100 is mounted (mount) during performance of low efficiency power generation is the first mode in which the P range is selected as the shift range, the feed flow rate control part controls the FC air feed quantity Qfc so that the amount of heat generation of the fuel cell stack 10 accompanying the power generation loss becomes the first amount of heat generation PL1 and when the state of the vehicle is the second mode in which the D range or R range is selected as the shift range and in which the generated electric power of the fuel cell stack 10 fluctuates more easily compared with the first mode, the feed flow rate control part controls the FC air feed quantity Qfc so that the amount of heat generation becomes the second amount of heat generation PL2 smaller than the first amount of heat generation PL1.

Due to the above, when the shift range is the P range, it is possible to make the amount of heat generation of the fuel cell stack 10 increase and quickly promote warmup of the fuel cell stack 10. Further, when the shift range is switched to the D range or R range, it is possible to keep down the amount of heat generation to a certain extent to thereby warm up the fuel cell stack 10 while keeping deviation from occurring between the actual generated electric power Pfc and the target generated electric power Ptg and keeping the battery from becoming an overcharged state or overdischarged state.

Further, the feed flow rate control part according to the present embodiment controls the FC air feed quantity Qfc so that the amount of heat generation during the second mode becomes the third amount of heat generation PL3 smaller than the second amount of heat generation PL2 based on at least one of the allowable charged electric power Win or allowable discharged electric power Wout of the battery 53 determined based on the state of the battery.

Specifically, when the state of the vehicle is the second mode, the feed flow rate control part controls the FC air feed quantity Qfc so that the amount of heat generation becomes the third amount of heat generation PL3 if the allowable charged electric power Win is less than a predetermined second charging side threshold value Win2 smaller than the predetermined first charging side threshold value Win1 or the allowable discharged electric power Wout is less than a predetermined second discharging side threshold value Wout2 smaller than the predetermined first discharging side threshold value Wout1 and controls the FC air feed quantity Qfc so that the amount of heat generation becomes the second amount of heat generation PL2 if the allowable charged electric power Win is equal to or greater than the first charging side threshold value Win1 and the allowable discharged electric power Wout is equal to or greater than the first discharging side threshold value Wou1.

The smaller the allowable charged electric power Win or allowable discharged electric power Wout of the battery, when deviation occurs between the actual generated electric power Pfc and the target generated electric power Ptg, the easier the battery becomes an overcharged state or overdischarged state. As opposed to this, in the present embodiment, when the allowable charged electric power Win or allowable discharged electric power Wout of the battery is small, the amount of heat generation can be kept down to the third amount of heat generation PL3 lower than the second amount of heat generation PL2, so it is possible to keep deviation from occurring between the actual generated electric power Pfc and the target generated electric power Ptg even more. For this reason, the battery can be kept from becoming an overcharged state or overdischarged state.

Above, an embodiment of the present disclosure was explained, but the above embodiment merely shows part of the examples of application of the present disclosure and is not meant to limit the technical scope of the present disclosure to the specific constitution of the above embodiment.

For example, in the above embodiment, the explanation was given with reference to the example of the case mounting the fuel cell system 100 in a vehicle, but the disclosure is not limited to a vehicle and can be mounted in various mobile members. It may be mounted in a stationary type power generation facility as well. Therefore, the first mode is not limited to the case where the P range is selected as the shift range. Further, similarly, the second mode is also not limited to the case where the D range or R range is selected as the shift range.

Further, in the above embodiment, in the processing for setting the target amount of heat generation, the second charging side threshold value Win2 when switching the target amount of heat generation PLtg from the second amount of heat generation PL2 to the third amount of heat generation PL3 and the first charging side threshold value Win1 when switching the target amount of heat generation PLtg from the third amount of heat generation PL3 to the second amount of heat generation PL2 were made respectively different values for preventing the occurrence of hunting where the target amount of heat generation PLtg is repeatedly switched. Further, similarly the second discharging side threshold value Wout2 when switching the target amount of heat generation PLtg from the second amount of heat generation PL2 to the third amount of heat generation PL3 and the first discharging side threshold value Wout1 when switching the target amount of heat generation PLtg from the third amount of heat generation PL3 to the second amount of heat generation PL2 were made respectively different values. However, more simply, as shown in the flow chart shown in FIG. 11, the charging side threshold value may be fixed at either of Win1 or Win2. Similarly, the discharging side threshold value may be fixed at either of Wout1 or Wout2. That is, the above-mentioned feed flow rate control part may also be configured to control the flow rate of feed of the oxidizing agent gas so that the amount of heat generation during the second mode becomes the third amount of heat generation PL3 if the allowable charged electric power Win is less than the predetermined charging side threshold value while it may also be configured to control the flow rate of feed of the oxidizing agent gas so that the amount of heat generation during the second mode becomes the third amount of heat generation PL3 if the allowable discharged electric power Wout is less than the predetermined discharging side threshold value.

The invention claimed is:

1. A fuel cell system comprising:
a fuel cell configured to generate electric power by electrochemical reactions between a fuel gas and oxidizing agent gas;
a rechargeable battery configured to be charged with excess electric power and configured to discharge an insufficient amount of electric power at the time of electric power generation of the fuel cell; and
a control device, wherein
the control device comprises:
a feed flow rate control part programmed to control a flow rate of feed of oxidizing agent gas to be supplied to the fuel cell; and
a power generation part programmed to perform low efficiency power generation in which the power generation loss is greater than normal power generation, and wherein
the feed flow rate control part is programmed to:
control the flow rate of feed of the oxidizing agent gas so that the amount of heat generation of the fuel cell accompanying power generation loss becomes a first amount of heat generation when, during performance of low efficiency power generation, the state of a mount on which the fuel cell system is mounted is a first mode; and
control the flow rate of feed of the oxidizing agent gas so that the amount of heat generation becomes a second amount of heat generation smaller than the first amount of heat generation when, during performance of low efficiency power generation, the state of the mount is a second mode where the generated electric power of the fuel cell fluctuates more easily compared with the first mode.

2. The fuel cell system according to claim 1, wherein the feed flow rate control part is programmed to control the flow rate of feed of the oxidizing agent gas so that the amount of heat generation during the second mode becomes a third amount of heat generation smaller than the second amount of heat generation based on at least one of an allowable charged electric power or allowable discharged electric power of a secondary battery determined based on the state of the secondary battery.

3. The fuel cell system according to claim 2, wherein the feed flow rate control part is programmed to control the flow rate of feed of the oxidizing agent gas so that the amount of heat generation during the second mode becomes the third amount of heat generation if the allowable charged electric power is less than a predetermined charging side threshold value.

4. The fuel cell system according to claim 2, wherein the feed flow rate control part is programmed to control the flow rate of feed of the oxidizing agent gas so that the amount of heat generation during the second mode becomes the third amount of heat generation if the allowable discharged electric power is less than a predetermined discharging side threshold value.

5. The fuel cell system according to claim 2, wherein the feed flow rate control part is programmed so that, when the state of the mount is the second mode,
- it controls a flow rate of feed of the oxidizing agent gas so that the amount of heat generation becomes a third amount of heat generation if the allowable charged electric power is less than a predetermined second charging side threshold value smaller than a predetermined first charging side threshold value or the allowable discharged electric power is less than a predetermined second discharging side threshold value smaller than a predetermined first discharging side threshold value and
- it controls a flow rate of feed of the oxidizing agent gas so that the amount of heat generation becomes a second amount of heat generation if the allowable charged electric power is equal to or greater than a first charging side threshold value and the allowable discharged electric power is equal to or greater than a predetermined first discharging side threshold value.

6. The fuel cell system according to claim 1, wherein the mount is a vehicle,
the first mode is a state where a parking range is selected as a shift range of the vehicle, and
the second mode is a state where a drive range or reverse range is selected as the shift range.

7. A control method for a fuel cell system, wherein the fuel cell system comprises:
- a fuel cell configured to generate electric power by electrochemical reactions between a fuel gas and oxidizing agent gas;
- a rechargeable battery configured to be charged with excess electric power and configured to discharge an insufficient amount of electric power at the time of electric power generation of the fuel cell, and wherein the control method comprises:
- controlling the flow rate of feed of the oxidizing agent gas to be supplied to the fuel cell so that the amount of heat generation of the fuel cell accompanying power generation loss becomes a first amount of heat generation when, during performance of low efficiency power generation in which the power generation loss is greater than normal power generation, the state of a mount on which the fuel cell system is mounted is a first mode; and
- controlling the flow rate of feed of the oxidizing agent gas to be supplied to the fuel cell so that the amount of heat generation becomes a second amount of heat generation smaller than the first amount of heat generation when, during performance of low efficiency power generation, the state of the mount is a second mode where the generated electric power of the fuel cell fluctuates more easily compared with the first mode.

* * * * *